3,193,542
PRODUCTION OF POLYVINYL ALCOHOL HAVING IMPROVED CHARACTERISTICS
Kiyokazu Imai, Kurashiki, Japan, assignor to Kurashiki Rayon Co., Ltd., Kurashiki-shi, Japan, a corporation of Japan
No Drawing. Filed May 22, 1961, Ser. No. 111,436
Claims priority, application Japan, May 25, 1960, 35/25,285
4 Claims. (Cl. 260—91.3)

The present invention relates to the polymerization of vinyl acetate and is more particularly concerned with a method of polymerizing vinyl acetate to produce a polyvinyl acetate capable of yielding, upon hydrolysis or "saponification," polyvinyl alcohol having improved characteristics.

Polyvinyl alcohol is a polymer containing hydroxyl groups and corresponding to the formula:

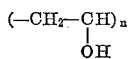

wherein $n$ is an integer which can vary within wide limits, as is well-known in the art. Polyvinyl alcohol can be produced from the corresponding polyvinyl ester, e.g., polyvinyl acetate, by alkaline or acid saponification or re-esterification, i.e., alcoholysis, in accordance with the following equation:

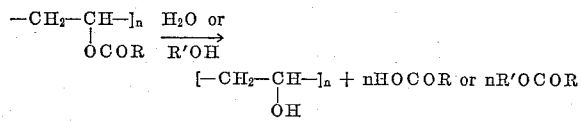

It is known that the degree of swelling in water of polyvinyl alcohol is related to the method of polymerization of the original polyvinyl acetate from which the polyvinyl alcohol is derived, and that the lower the polymerization temperature, the lower is the degree of swelling of the polyvinyl alcohol. This suggests that the degree of swelling is closely related to the molecular structure of the polyvinyl alcohol. Generally, polyvinyl alcohol of a lower degree of swelling is more regular with respect to its molecular structure, and accordingly, such a polyvinyl alcohol may be said to have a better crystallizability.

It is an object of the present invention to provide an improved process for making polyvinyl acetate which is convertible, by conventional saponification, into polyvinyl alcohol of a desired low degree of swelling in water.

It is a further object of the invention to provide a process of polymerizing vinyl acetate to produce a polyvinyl acetate which can be converted to polyvinyl alcohol from which films having a very low degree of swelling in water can be formed.

In accordance with the present invention, vinyl acetate is polymerized in a solvent in the presence of a conventional polymerization catalyst, e.g., an azo nitrile catalyst, in combination with boric acid. I have discovered that polymers obtained by such polymerization in the presence of boric acid have unusual properties not found in polymers obtained by comparable polymerization in the absence of boric acid. Thus, I have found that the value of time $t_{1/2}$, in the expression $t_{1/2} \cdot P_A^{0.6}$ (wherein $P_A$ represents the degree of polymerization of the polyvinyl alcohol produced) required for a hydrous dimethyl sulfoxide solution of the polyvinyl alcohol obtained by conventional saponification of the polyvinyl acetate produced by polymerization in the system in accordance with this invention and comprising vinyl acetate, solvent, e.g., methanol, catalyst, and boric acid, to become turbid, was shorter compared with that required in the case of polyvinyl alcohol obtained from polyvinyl acetate produced by polymerization in a conventional methanol or ethyl acetate solution without the use of boric acid. The value of $t_{1/2} \cdot P_A^{0.6}$ observable with a hydrous dimethyl sulfoxide solution of polyvinyl alcohol corresponds generally with the degree of swelling of polyvinyl alcohol films, the degree of swelling being smaller for smaller values of $t_{1/2} \cdot P_A^{0.6}$ (Chemistry of High Polymers, Japan, 16, 499 (1959)).

The results of the turbidity measurements referred to above indicate the superiority of the polyvinyl alcohol obtained from the polyvinyl acetate produced in the polymerization system containing boric acid with respect to crystallizability properties in comparison with the ordinary polyvinyl alcohol. The superior crystallizability properties of polyvinyl alcohol derived from the polyvinyl ester produced by the method of this invention are also evidenced by the color reaction of iodine on an aqueous solution of the polyvinyl alcohol.

In the vinyl acetate-methanol-boric acid-catalyst polymerization system described above, methanol is used only to fluidize the system. Accordingly, other solvents employed in vinyl acetate polymerization, such as ethanol, acetic acid, hydrous alcohols, hydrous acetic acid, and the like, may satisfactorily be used.

The invention will be further understood from the following specific examples of practical application. However, it will be understood that these examples are not to be construed as limiting the scope of the present invention in any manner. In the examples, all parts are by weight unless otherwise indicated.

As shown in Table 1, specified amounts of vinyl acetate, a solvent, boric acid, and 2,2'-azobisisobutyronitrile, were put into closed tubes and polymerized at 60° C. for the specified periods of time, polyvinyl acetate being obtained in each case. The total charge in each tube was 20 grams. The polyvinyl acetate obtained was then freed of boric acid by thoroughly washing it with boiling water, and after dissolving the fully dried product in methanol, it was converted into polyvinyl alcohol by the alkali-saponification process.

The clouding characteristics of the hydrous dimethylsulfoxide solution of the polyvinyl alcohol samples thus obtained were determined, and the results set forth in Table 1' were obtained. The measuring procedure employed corresponds to the method described in Chemistry of High Polymers, Japan, 16, 499 (1959).

Table 1

| Vinyl acetate (percent) | Solvent (percent) | Boric acid (percent) | 2,2'-azo-isobutyro-nitrile (percent) | Time (hr.) | Polymer conversion (percent) |
|---|---|---|---|---|---|
| 60 | Methanol 35 | 5 | 0.01 | 21 | 76 |
| 50 | Methanol 40 | 10 | 0.01 | 21 | 73 |
| 35 | Methanol 50 | 15 | 0.01 | 25 | 77 |
| 40 | Ethylacetate 60 | 0 | 0.01 | 6 | 33 |
| 70 | Methanol 30 | 0 | 0.02 | 4 | 41 |
| 20 | Methanol 80 | 0 | 0.05 | 12 | 69 |

Table 1'

| Vinyl acetate (percent) | $P_{AC}$[a] | $P_A$[c] | $t_{1/2}$ (hr.) | $t_{1/2} \cdot P_A^{0.6} \times 10^{-3}$ (hr.) |
|---|---|---|---|---|
| 60 | 1,245 | 1,130 | 25.0 | 1.70 |
| 50 | 1,145 | 1,095 | 21.3 | 1.43 |
| 35 | 588 | 682 | 24.3 | 1.23 |
| 40 |  | 1,290 | 63.8 | 4.68 |
| 70 | 1,470 | 1,440 | 30.5 | 2.40 |
| 20 |  | [b] 509 | [b] 50.0 | [b] 2.10 |

[a] Degree of polymerization of polyvinyl acetate.
[b] Values for fractionated products.
[c] Degree of polymerization of polyvinyl alcohol.

Table 1' clearly shows that $t_{1/2}$ in $t_{1/2} \cdot P_A^{0.6}$ of the polyvinyl alcohol derived from polyvinyl acetate produced in the polymerization system containing boric acid is shorter than any of the corresponding values for polyvinyl acohol obtained from polyvinyl acetate produced by conventional polymerization in ethylacetate or methanol. This is clear evidence of the former product's superiority with respect to crystallizability and consequently with respect to resistance to water. As previously indicated the measuring procedures utilized to determine the clouding characteristics or the turbidity characteristics of the hydrous dimethyl sulfoxide solutions of the polyvinyl alcohol samples listed in Table 1' were according to the procedures described in Chemistry of High Polymers, Japan, 16, 499 (1959). As described in said literature article, a solution of polyvinyl alcohol in aqueous or hydrous dimethyl sulfoxide, if left standing, becomes turbid or cloudy and forms a gel. The turbidity or clouding characteristics of the polyvinyl alcohol-aqueous dimethyl sulfoxide solutions were determined by passing a light beam of known intensity through the solution and measuring the intensity of the light after it had passed through the solution. Measurements were continued until the maximum degree of clouding or the equilibrium degree of turbidity was reached. A plot or graph was prepared of the percent of light transmission or the amount of light absorbance versus the time of standing of the solution. From the curve, there was obtained the value $t_{1/2}$, which corresponds to the standing time required to reach one-half the turbidity equilibrium value or maximum absorbance value. The value $t_{1/2}$ will vary depending on the degree of polymerization of the polyvinyl alcohol. It has been found that the time $t_{1/2}$ is a function of the degree of polymerization; and for comparing the turbidity characteristic of polyvinyl alcohols having different degrees of polymerization, the value $t_{1/2} \cdot P_A^{0.6}$ is used. The following is a more detailed description of the experimental techniques and procedures utilized for measuring the turbidity characteristics of polyvinyl alcohol-aqueous dimethyl sulfoxide solutions.

The polyvinyl alcohol was prepared by known alkali-saponification techniques. The polyvinyl alcohol was dried in air and then dried at 65° C. under reduced pressure in the presence of a silica gel drying agent. Distilled water and distilled dimethyl sulfoxide were used to prepare an aqueous solution of dimethyl sulfoxide containing 40% by weight of water. Forty-five mg. of the dried polyvinyl alcohol was added to a test tube containing 15 cc. of the previously prepared aqueous dimethyl sulfoxide solution. The test tube was sealed and the mixture was agitated and heated, using a water bath, to dissolve the polyvinyl alcohol. The concentration of the polyvinyl alcohol in the resultant solution was 3 grams/liter. This solution was passed through filter paper and stored at 30±0.03° C. Utilizing a photoelectric spectrophotomer, measurements of the light transmission properties of the solution were made at various intervals of standing time with the solution contained in a 10 mm. glass cell. The wave length of the light used was 430 mμ. Measurements of the light transmission properties of the solution were continued until equilibrium was obtained or the maximum degree of turbidity was obtained. The values of percent transmission were plotted against the time the solution had been allowed to stand after preparation, and a curve was obtained illustrating the decrease in light transmission versus standing time. The value or standing time $t_{1/2}$, being the standing time required for the decrease in light transmission to reach one-half of the equilibrium value or maximum turbidity, was obtained from the curve.

The conditions and relative relationships set forth in the examples are those preferred but it will be understood that other conditions and relationships may be used within the scope of the invention. For example, the use of 5 to 15% by weight of boric acid in the polymerization mixture, along with 35 to 60% vinyl acetate, is preferred. In general, unless otherwise indicated, conventional operations and techniques are suitably employed. For example, the polymerization catalyst employed may be any of the conventional catalysts used in the polymerization of vinyl esters, e.g., vinyl acetate, such as azonitriles or peroxides, but the use of azonitriles is preferred. Thus, conventional vinyl ester polymerization techniques, catalysts and polymerization apparatus are employed and suitable polymerization catalysts, vessels and techniques are described, for example, in Cline et al. U.S. Patent 2,610,360. Conventional techniques and operations are also employed in the conversion of the vinyl copolymers into polyvinyl alcohol.

With respect to known saponification processes and techniques, reference is suitably made, for example, to Bristol U.S. Patent 2,700,035, Waugh et al. U.S. Patent 2,642,419 and German U.S. Patent 2,643,994.

Although forming no part of the present invention, the polyvinyl alcohol is formed into fibers, films, and other shaped forms by following conventional practice. The spinning of polyvinyl alcohol to form fibers, particularly the so-called "wet-spinning" technique is described, for example, in the above-mentioned Cline et al. U.S. Patent 2,610,360 and in Osugi et al. Patent No. 2,906,594. An especially preferred spinning technique is described in copending application Serial No. 336,166 of Tomonari et al. filed February 10, 1953.

In any case, conventional dry-spinning or wet-spinning operations are employed in producing the fibers and subsequent heat-treatment, stretching and relaxation are effected using known techniques as described, for example, in said patents.

Similarly, films and other shaped forms of polyvinyl alcohol are suitably produced in conventional manner as described, for example, in Schnabel U.S. Patent 2,177,612.

The fibers, films, or other shaped objects producible from the polyvinyl alcohol may be acetalized in accordance with conventional practice in this art as described, for example, in the above-mentioned Osugi et al. Patent 2,906,594 and in Cline et al. Patents 2,636,803 and 2,749,208.

It will also be understood that various changes and modifications in addition to those indicated above may be made in the embodiments herein described without departing from the scope of the invention as defined in the appended claims. It is intended, therefore, that all matter contained in the foregoing description shall be interpreted

I claim:

1. A process of producing polyvinyl alcohol of improved characteristics which comprises homopolymerizing vinyl acetate in a polymerization system containing a free radical polymerization catalyst and from 35% to 60% by weight of vinyl acetate and from 5% to 15% by weight of boric acid, and saponifying the resultant polymer to produce polyvinyl alcohol.

2. A process of producing polyvinyl alcohol of improved characteristics which comprises homopolymerizing vinyl acetate in a polymerization system containing a free radical polymerization catalyst and a solvent and from 35% to 60% by weight of vinyl acetate and from 5% to 15% by weight of boric acid, and saponifying the resultant polymer to produce polyvinyl alcohol.

3. A process according to claim 2, wherein said solvent is methanol.

4. A process according to claim 2, wherein said solvent is ethyl acetate.

References Cited by the Examiner

UNITED STATES PATENTS

| 2,108,857 | 2/38 | Hopff et al. | 260—91.3 |
| 2,445,555 | 7/48 | Binda | 260—91.3 |

FOREIGN PATENTS

| 1,083,550 | 6/60 | Germany. |

JOSEPH L. SCHOFER, *Primary Examiner.*

PHILIP E. MANGAN, JOSEPH R. LIBERMAN, WILLIAM H. SHORT, *Examiners.*